United States Patent Office 2,897,104
Patented July 28, 1959

2,897,104
SILICONE RESIN REMOVER AND METHOD

Ira J. Duncan, Detroit, Mich., assignor to Detrex Chemical Industries, Inc., Detroit, Mich., a corporation of Michigan No Drawing. Application April 20, 1954
Serial No. 424,512

6 Claims. (Cl. 134—29)

This invention relates to compositions and methods for removing hardened silicone resin glazes from metal surfaces and more particularly relates to compositions containing an alkali metal base, a liquid hydrocarbon solvent and a co-solvent therefor and to a process which comprises contacting the silicone resin with the aforementioned composition and removing said silicone resin from its associated metallic surface by rinsing with water. This application is a continuation-in-part of my co-pending application Serial No. 190,661, filed October 17, 1950, now abandoned.

The silicone resins removed by the processes and compositions of this invention are long-chain polymers quite different physically and chemically from silicone greases and similar short-chain silicone polymers of relatively low molecular weight. They are sometimes referred to as hardened siloxane resinous coatings. Various references are found in the patent literature and in other literature to the effect that compositions containing an alkali metal hydroxide and an alcohol are effective in dissolving silicone resins, but upon following such teachings in an attempt to dissolve long-chain hardened or baked silicone resin glazes it has been found either that no reaction takes place or that the reaction is too slow to permit any practical use in industry unless a mixture containing a dangerously high percentage of corrosive caustic soda is used. Even in the latter case the resin removal is incomplete and vigorous application of mechanical force is needed to remove the residual glaze. Several references mention the solubility of silicone resins in various solvents such as benzene, toluene, ethers, gasoline and oils such as soya bean oil or linseed oil, but these two are necessarily restricted to the silicone resins of lower molecular weight since the hardened or baked silicone resin glazes have been found to resist the action of any of the aforementioned compositions.

It is therefore an object of this invention to remove a hardened or baked silicone resin glaze of high molecular weight from an associated surface. It is a further object to provide a harmless, non-corrosive composition for converting an insoluble hardened or baked silicone glaze of high molecular weight to a composition easily removed with water. A still further object of the invention is to provide a process for removing such a silicone resin glaze without exerting undue mechanical force. Other objects will appear hereinafter.

The foregoing and other objects are attained by the novel combination of an alkali metal base, a liquid hydrocarbon solvent and a co-solvent for said hydrocarbon and said alkali metal base. When a long-chain silicone polymer is contacted with the inventive composition, a physical or chemical change takes place in the resin by which the resin is made easily removable from the associated surface by rinsing with water.

The term "alkali metal base" as used in the description of this invention is meant to include the basic compounds of the metals sodium, potassuim, lithium, rubidium, caesium and the like, including the hydroxides, oxides, alcoholates and their equivalents.

The liquid hydrocarbon solvents which constitute the second principal component of the compositions of this invention include the chlorinated hydrocarbons, aliphatic hydrocarbons in the form of petroleum distillation products, and aromatic hydrocarbons.

The chlorinated hydrocarbons are either partially chlorinated or fully chlorinated hydrocarbons of the group which includes methylene chloride and perchlorethylene. Methylene chloride has the formula $CH_2Cl_2$ and is a colorless liquid boiling at 42° C. Perchlorethylene, an unsaturated chlorinated hydrocarbon, is also known as tetrachlorethylene and has the formula $CCl_2=CCl_2$. It is a colorless liquid boiling at 121° C. Among the chlorinated hydrocarbons perchlorethylene is preferred in the practice of this invention since its effectiveness is superior and it is non-flammable and has a low toxicity. Trichlorethylene should be avoided in practicing this invention since it is readily dehydrochlorinated on mixing with an alkali metal base and forms explosive peroxide compounds.

Another group of liquid hydrocarbon solvents comprise the aliphatic hydrocarbon fractions produced in the distillation of petroleum oil, ordinarily containing mixtures of saturated hydrocarbons having the formula $C_nH_{2n+2}$ in which $n$ is an integer from 5 to 12. These hydrocarbons are pentane, hexane, heptane, octane nonane, decane, undecane, and dodecane, including isomers thereof. One petroleum fraction commonly known as petroleum ether, which consists principally of hexane, has a boiling range of 40–60° C. and a specific gravity of 0.63–0.67. Another such fraction is gasoline which consists chiefly of the hexanes and heptanes and also contains a smaller quantity of pentanes and octanes. Gasoline has a boiling range of about 60–120° C. and a specific gravity of 0.66–0.69. A preferable petroleum fraction for purposes of the present invention is petroleum spirits which consists principally of hexanes, heptanes, and small proportions of octanes, boils in the range of 80–130° C. and has a specific gravity of 0.730 at 15° C. Other petroleum hydrocarbons are known commerecially as V.M. & P. naphtha which has a boiling range of 100–160° C. and a specific gravity of 0.75–0.77, and mineral spirit, 90% of which boils below 200° C., specific gravity 0.77–0.80. Kerosene constitutes another aliphatic hydrocarbon mixture of the invention, boiling between 150 and 200° C. Fuel oil, the product resulting from distillation of gasoline and kerosene from petroleum, which is also a liquid hydrocarbon fraction in accordance with the invention, has a boiling range about that of kerosene and may have a viscosity up to 375° Engler at 100° F.

Another group of liquid hydrocarbon solvents embodied in the compositions of the invention are the lower aromatic hydrocarbons which may be derived from petroleum distillation or otherwise. Among such aromatic solvents are the members of the benzene series, including benzene, toluene, xylene, isomers thereof, and the alkyl substitutes such as methyl, ethyl or propyl benzene and the like. Also within the scope of the invention are the corresponding isomers such as isopropyl benzene and the like. Aromatic distillation fractions obtained from crude oils fall within the scope of the present invention. These may consist entirely of aromatic compounds or may be mixtures of aromatic and aliphatic hydrocarbons. Such distillation fractions include the crude oil fractions having boiling ranges substantially within the limits 212–540° F., and these preferably have closed cup flash points of 20–160° F., kauri butanol values of 65–110, aniline points of −50° to +70° F., specific gravities of .82–.94, and aromatic equivalent values of 70–100. Examples of aromatic crude oil fractions include mixtures having the following characteristics:

| Boiling range, °F. | Flash point, °F., closed cup | Kauri butanol value | Aniline point, °F. | Spec. gravity | Aromatic equivalent value |
|---|---|---|---|---|---|
| 212–238 | 30 | 88.2 | −16 | .8393 | 83 |
| 272–301 | 80 | 86.5 | −6 | .8555 | 86 |
| 335–405 | 122 | 72 | +16 | .8607 | 72 |
| 307–340 | 102 | 91 | −44 | .873 | 100 |
| 370–402 | 153 | 87 | −18 | .8911 | 100 |
| 357–399 | 140 | 95 | 56 | .890 | 100 |
| 335–540 | 141 | 105 | 70 | .928 | 100 |

The liquid hydrocarbon solvents also include the terpenes such as pinene, the cymenes, turpentines such as gum turpentine and wood turpentine, and dipentenes including dextro, laevo, and dextro-laevo limonene (dipentene).

The co-solvents chosen as components of the inventive compositions must possess the property of dissolving the alkali metal base and should be miscible in substantial proportions with the hydrocarbons. Many of the aliphatic alcohols such as unsubstituted alcohols and ether-alcohols are effective co-solvents for alkali metal bases and the aforementioned hydrocarbons, such as ethanol, iso-propyl alcohol, n-propyl alcohol, n-butyl alcohol, iso-butyl alcohol, secondary butyl alcohol, the amyl alcohols, methyl Cellosolve (ethylene glycol monomethyl ether), iso-propyl Cellosolve (ethylene glycol mono-isopropyl ether), methyl Carbitol (diethylene glycol monomethyl ether), iso-propyl Carbitol (diethylene glycol isopropyl ether), polyethylene glycol, a poly ether glycol, methanol, ethylene glycol monopropyl ether, ethylene glycol monobutyl ether, diethylene glycol propyl ether, diethylene glycol butyl ether, propylene glycol methyl ether, propylene glycol ethyl ether, dipropylene glycol methyl ether, tripropylene glycol monomethyl ether, propylene glycol, dipropylene glycol, tripropylene glycol, ethylene glycol monoethyl ether, diethylene glycol monoethyl ether, and the like. Various other alcohols, ether-alcohols, and even ring compounds such as morpholine and the like possess co-solvent properties for an alkali metal base on the one hand and the hydrocarbon solvent on the other.

In the aforementioned compositions, particularly those containing enough alkali metal base to brighten a tin plated base metal, the use of a corrosion inhibitor is found to be advantageous. The following compounds have been found to be effective in reducing the corrosion or brightening of tin surfaces when provided in proportions of 0.1–5% by weight as components of compositions of this invention: Hydroquinone, pyrogallol, pyrogallic acid, nitrobenzene, benzoyl peroxide, furfural, furfuryl alcohol, phenol, cresol, and thiocyanates such as benzyl thiocyanate or sodium, potassium or ammonium thiocyanate, for example.

In practice, the compositions of this invention are conveniently formulated by mixing the co-solvent, hydrocarbon, and inhibitor. To this mixture the alkali metal base, in the dry state, is added. Accordingly the resulting composition is substantially free of water. The composition is preferably heated to a temperature of approximately 55°–75° C. and contacted with the silicone resin glaze desired to be removed. After a few minutes have elapsed the silicone resin glaze apparently undergoes a gradual change and upon removing the composition of this invention from the surface of the glaze the silicone resin is completely removed by rinsing with water.

The three major components of this composition are effective over a wide range of proportions and the effectiveness of the mixture diminishes only when the hydrocarbon or the alkali metal base is present in a very low percentage. It may be stated generally that the alkali metal base should comprise at least .02% and the hydrocarbon 1% by weight of the composition in order to attain a noticeable improvement in glaze removal. The amount of alkali metal base is preferably held below 5% by weight when the silicone resin to be removed is associated with a tin surface or other surface easily attacked by strong alkalis. The proportion of co-solvent in the composition may be varied widely but it is generally necessary to provide enough co-solvent to dissolve the bulk of the alkali metal base present and to effect solution with the other components of the composition. The proportion of hydrocarbon similarly varies widely and is determined by the proportions of the other ingredients, and excellent results are attained in some compositions containing as much as 97% by weight hydrocarbon solvent.

Experiments have indicated that unusually fast glaze removal is attained without brightening a tin surface upon which the resin has been deposited as a glaze when ethanol or methyl Cellosolve is provided as co-solvent and the proportion of alkali metal base lies between 0.05% by weight and 1.5% by weight and the designated hydrocarbon comprises 70–95% by weight. When these ideal compositions are contacted with a silicone resin glaze for a few minutes at a temperature of about 75° C. the hard baked resin is changed and is easily removed in a subsequent water rinse. The stability and anticorrosion properties of these compositions are enhanced by addition of 0.25–1.0% phenol.

The remarkable ability of the inventive compositions to condition hardened silicone resin glazes so that they are removable by water does not appear to result from any property of an individual component of the composition. Caustic soda and similar alkali metal bases are without effect on long-chain silicone glazes and the designated hydrocarbons alone similarly do not attack such glazes even after long periods of contact at elevated temperature. The co-solvents mentioned herein are similarly ineffective when used alone. Moreover, the combinations of such co-solvents with said designated hydrocarbons are either without effect or react with long-chain silicone resin glazes very slowly and incompletely and do not provide removal. Strangely enough the inventive composition retains its effectiveness even when the proportion of designated hydrocarbon exceeds 90%. While the reasons for the unusual action of the inventive compositions are not known, it is apparent that the silicone resin glaze is not dissolved by the compositions of this invention but is attacked physically or chemically or possibly physically and chemically in such a way that the attacked glaze is so readily soluble in water that it may be removed by rinsing with water without wiping or rubbing. The unique and unexpected nature of the way in which the processes and compositions of the present invention operate will appear from the specific examples set forth below.

*Example 1*

A silicone resin marketed under the trade-name "Pan Glaze" by the Dow-Corning Corporation, Midland, Michigan, was applied to the surface of a tin-plated bread pan and the pan was placed in a baking oven at 220° C. for four hours, the duration of a normal baking cycle, and then removed. The pan was then immersed for 15 minutes in a solution containing .60 gram NaOH, 32.7 grams ethanol and 66.7 grams perchlorethylene and the solution maintained at about 75° C. Complete silicone glaze removal was attained on a subsequent water rinse followed by a slight wiping. No tin attack was apparent.

*Example 2*

The procedure of Example 1 was followed using 0.1 gram NaOH, 5.2 grams ethanol and 94.7 grams perchlorethylene. A complete silicone glaze removal was attained without wiping and the tin attack was slight.

Example 3

The procedure of Example 1 was followed using 1.0 gram NaOH, 6.0 grams methyl Cellosolve and 93.0 grams perchlorethylene. Silicone removal was complete in 15 minutes without wiping and there was no observable tin attack.

Example 4

The procedure of Example 1 was followed, using 0.6 gram NaOH, 16.5 grams methyl Cellosolve, 1.0 gram phenol and 81.0 grams perchlorethylene. Silicone removal was complete in 4 minutes at 70° C. without wiping and there was no indication of tin attack.

Example 5

The procedure of Example 1 was followed, using the same composition as given in Example 1 except the 0.6 gram NaOH was replaced with 0.6 gram sodium methylate. Silicone removal was complete in 10 minutes at 75° C. without wiping and there was no tin attack.

Example 6

A mixture consisting of 25% ethylene glycol monoethyl ether, 0.8% NaOH, and 72.4% petroleum distillation fraction having a boiling range of 370-402° F. was prepared, the foregoing percentages being by weight. The petroleum distillation fraction had a closed cup flash point of 153° F., kauri butanol test value of 87, aniline point of −18° F., specific gravity .8911, and an aromatic equivalent value of 100. This mixture effectively removed silicone resin glaze of the character described in Example 1 in 5 minutes at 60° C., followed by a water rinse.

Example 7

A mixture composed of 25% ethylene glycol monomethyl ether, 74.2% toluene and 0.8% NaOH, percentages being by weight, effectively removed baked silicone resin glaze in 8 minutes at 60° C. when followed by a water rinse.

Example 8

A mixture composed of 20% by weight ethylene glycol monomethyl ether, 30% by weight fuel oil, 39.2% by weight perchlorethylene, and 0.8% by weight NaOH effectively removed baked silicone resin glaze in 10 minutes at 60° C., when followed by water rinse.

Example 9

A mixture composed of 20% by weight ethylene glycol monomethyl ether, 39.2% by weight perchlorethylene, 0.8% NaOH by weight, and 40% by weight aromatic petroleum distillation product was prepared. The aromatic petroleum distillation product was a solvent having a boiling point of 335–405° F., closed cup flash point of 122° F., kauri butanol test value of 72, aniline point of 116° F., specific gravity .8607, and aromatic equivalent value of 72. This mixture effectively removed silicone resin glaze in 5 minutes at 60° C. when followed by a water rinse.

Example 10

A mixture is prepared consisting of:

| | Percent by weight |
|---|---|
| KOH | 1 |
| Ethylene glycol mono isopropyl ether | 29 |
| Crude oil distillation product (boiling range 212–238° F.) | 70 |

A tin plated metal strip is coated with silicone resin and baked. The above solution is heated to about 60° C., and the strip is immersed in the solution for 5 minutes and then removed from the solution. The strip is then rinsed with water, resulting in complete removal of the silicone resin without attacking the tin-tin oxide surface.

Example 11

The procedure of Example 10 is followed, substituting the following solution:

| | Percent by weight |
|---|---|
| NaOH | 4 |
| Tripropylene glycol monomethyl ether | 25 |
| Crude oil distillation product | 71 |
| (Boiling range, 272–301° F.; closed cup flash point, 80° F.; kauri butanol value, 86.5; aniline value, −6; specific gravity, .855; aromatic equivalent value 86.) | |

The above solution, at 70° C., removes baked silicone resin without attacking the tin.

Other solutions which are effective agents for removing baked or hardened silicone resins from metal surfaces containing tin are illustrated in the following specific examples. The solutions are utilized in the manner previously described, effectively removing the silicone resin without attacking the tin.

Example 12

| | Percent by weight |
|---|---|
| KOH | 0.5 |
| Diethylene glycol monomethyl ether | 3.95 |
| Crude oil distillation product | 96 |
| (Boiling range, 335–405° F.; closed cup flash point, 122° F.; kauri butanol value, 72; aniline point, +16° F.; specific gravity, .8607; aromatic equivalent value, 72.) | |

Example 13

| | Percent by weight |
|---|---|
| NaOH | 2 |
| Diethylene glycol mono isopropyl ether | 23 |
| Crude oil distillation product (boiling range 307–340° F.) | 4.99 |
| Perchlorethylene | 70 |
| Phenol | .01 |

Example 14

| | Percent by weight |
|---|---|
| KOH | 1 |
| Ethylene glycol monobutyl ether | 25 |
| Crude oil distillation product (boiling range 370–402° F.) | 30 |
| Perchlorethylene | 44 |

Example 15

| | Percent by weight |
|---|---|
| NaOH | .02 |
| Diethylene glycol propyl ether | 3.5 |
| Crude oil distillation product (boiling range 357–399° F.) | 95.48 |
| Phenol | 1 |

Example 16

| | Percent by weight |
|---|---|
| KOH | 1 |
| Diethylene glycol butyl ether | 24 |
| Crude oil distillation product (boiling range 335–540° F.) | 75 |

Example 17

| | Percent by weight |
|---|---|
| NaOH | 3 |
| Propylene glycol methyl ether | 4 |
| Crude oil distillation product (boiling range 335–405° F.) | 93 |

Example 18

| | Percent by weight |
|---|---|
| KOH | 1 |
| Dipropylene glycol methyl ether | 25 |
| Crude oil distillation product (boiling range 357–399° F.) | 1 |
| Perchlorethylene | 73 |

Example 19

| | Percent by weight |
|---|---|
| NaOH | 5 |
| Tripropylene glycol monomethyl ether | 20 |
| Crude oil distillation product (boiling range 307–340° F.) | 30 |
| Toluene | 45 |

Example 20

| | Percent by weight |
|---|---|
| KOH | 1 |
| Ethylene glycol monoethyl ether | 19 |
| Crude oil distillation product (boiling range 272–301° F.) | 80 |
| Phenol | 5 |

Example 21

| | Percent by weight |
|---|---|
| NaOH | .02 |
| Diethylene glycol monoethyl ether | 15 |
| Crude oil distillation product (boiling range 335–540° F.) | 84.98 |

It will be appreciated that the foregoing examples are illustrative and that the proportions of ingredients may be varied within limits as previously indicated herein, subject to the limitation that the co-solvent must be present in a proportion sufficient to effect the mutual dissolution of the alkali metal base and the liquid hydrocarbon solvent. It will further be appreciated that the invention may be carried out to advantage by substituting equivalents for the substances disclosed and claimed or by incorporating compatible mixtures containing more than one liquid hydrocarbon solvent, or co-solvent, or alkali metal base into the compositions.

Having thus described my invention, I claim:

1. A composition for treating a hardened silicone resin glaze to make it water removable which consists essentially by weight of .02–5% alkali metal hydroxide, 70–97% liquid hydrocarbon solvent comprising a crude oil distillation fraction having a boiling range falling between 212° and 540° F. and the balance consisting of a co-solvent selected from the group consisting of ethylene glycol monomethyl ether, diethylene glycol monomethyl ether, ethylene glycol monopropyl ether, ethylene glycol monobutyl ether, diethylene glycol monopropyl ether, diethylene glycol butyl ether, propylene glycol methyl ether, propylene glycol ethyl ether, dipropylene glycol methyl ether, ethylene glycol monoethyl ether, diethylene glycol monoethyl ether, and tripropylene glycol methyl ether.

2. A composition for treating a hardened silicone resin glaze to make it water removable without wiping which comprises by weight .05–5.0% alkali metal base selected from the group consisting of sodium hydroxide and potassium hydroxide, 70%–95% liquid hydrocarbon solvent comprising a crude oil distillation fraction having a boiling range falling between 212° and 540° F. and 3.5%–29.95% monohydric glycol ether, selected from the group consisting of ethylene glycol monomethyl ether, diethylene glycol monomethyl ether, ethylene glycol monopropyl ether, ethylene glycol monobutyl ether, diethylene glycol monopropyl ether, diethylene glycol butyl ether, propylene glycol methyl ether, propylene glycol ethyl ether, dipropylene glycol methyl ether, ethylene glycol monoethyl ether, diethylene glycol monoethyl ether, and tripropylene glycol methyl ether.

3. A composition for treating a hardened silicone resin glaze to make it removable without wiping from a metal surface by treatment with water, which consists essentially by weight of .05–1.5% alkali metal hydroxide, 70–95% liquid hydrocarbon solvent comprising a crude oil distillation fraction having a boiling range falling between 212° and 540° F. and 3.5–29.95% ethylene glycol monomethyl ether.

4. A composition for treating a hardened silicone resin glaze consisting essentially by weight of:

| | Percent |
|---|---|
| NaOH | .05–1.5 |
| Liquid hydrocarbon solvent comprising a crude oil distillation fraction having a boiling range falling between 212° and 540° F. | 70–95 |
| Ethylene glycol monomethyl ether | 3.5–29.95 |
| Phenol | .25–1.0 |

5. In a process for removing a hardened silicone resin glaze from an associated article having a surface containing tin without appreciably attacking said surface, the steps which comprise contacting the hardened silicone resin with a composition essentially by weight of about .02–5% alkali metal hydroxide, 1–97% by weight liquid hydrogen solvent comprising a crude oil distillation fraction having a boiling range falling between 212° and 540° F. and substantially the balance co-solvent selected from the group consisting of ethylene glycol monomethyl ether, diethylene glycol monomethyl ether, ethylene glycol monopropyl ether, ethylene glycol monobutyl ether, diethylene glycol propyl ether, diethylene glycol butyl ether, propylene glycol methyl ether, propylene glycol ethyl ether, dipropylene glycol methyl ether, ethylene glycol monoethyl ether, tripropylene glycol methyl ether, and diethylene glycol monoethyl ether, said co-solvent being capable of and present in sufficient amount to dissolve substantially all of said alkali metal base and to mix with said chlorinated hydrocarbon to form a homogeneous liquid, maintaining said contact for a time period sufficient to modify the hardened silicone resin glaze, maintaining said composition at about 55°–75° C. during the contact period, separating the aforesaid composition from the article, and removing the modified silicone resin by rinsing the surface of said article with water.

6. The method of removing hardened silicone resin glaze from a metal base having a surface containing tin without causing appreciable tin attack, comprising contacting the resin with a composition consisting essentially by weight of .02–5% sodium hydroxide and 1–97% liquid hydrocarbon solvent comprising a crude oil distillation fraction having a boiling range falling between 212° and 540° F. in the balance of ethylene glycol monomethyl ether, maintaining said composition at about 55–75° C. for a period sufficient to modify the hardened silicone resin glaze, removing the base and glaze from said composition, contacting the modified resin with water, and removing the resulting material from said base.

References Cited in the file of this patent

UNITED STATES PATENTS

| | | |
|---|---|---|
| 2,406,971 | Sowa | Sept. 3, 1946 |
| 2,432,665 | Hyde | Dec. 16, 1947 |
| 2,445,064 | Hall et al. | July 13, 1948 |
| 2,525,079 | Reeder et al. | Oct. 10, 1950 |
| 2,662,837 | Duncan | Dec. 15, 1953 |
| 2,710,843 | Stebleton | June 14, 1955 |
| 2,755,209 | Duncan | July 17, 1956 |